United States Patent
Hostache et al.

(10) Patent No.: US 10,453,205 B2
(45) Date of Patent: Oct. 22, 2019

(54) HIERARCHICAL TILING METHOD FOR IDENTIFYING A TYPE OF SURFACE IN A DIGITAL IMAGE

(71) Applicant: Luxembourg Institute of Science and Technology (LIST), Esch/Alzette (LU)

(72) Inventors: Renaud Hostache, Thionville (FR); Marco Chini, Luxembourg (LU); Patrick Matgen, Diekirch (LU); Laura Giustarini, Luxembourg (LU)

(73) Assignee: Luxembourg Institute of Science and Technology (LIST), Esch/Alzette (LU)

( * ) Notice: Subject to any disclaimer, the term of this patent is extended or adjusted under 35 U.S.C. 154(b) by 0 days.

(21) Appl. No.: 15/742,274

(22) PCT Filed: Jul. 5, 2016

(86) PCT No.: PCT/EP2016/065842
§ 371 (c)(1),
(2) Date: Jan. 5, 2018

(87) PCT Pub. No.: WO2017/005742
PCT Pub. Date: Jan. 12, 2017

(65) Prior Publication Data
US 2018/0197305 A1    Jul. 12, 2018

(30) Foreign Application Priority Data
Jul. 6, 2015  (LU) .......................................... 92763

(51) Int. Cl.
*G06T 7/41* (2017.01)
*G06K 9/00* (2006.01)

(52) U.S. Cl.
CPC .............. *G06T 7/41* (2017.01); *G06K 9/0063* (2013.01); *G06K 2009/00644* (2013.01); *G06T 2207/10044* (2013.01); *G06T 2207/20021* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 6,628,844 | B1 * | 9/2003 | Benitz | ................. | G01S 13/9011 382/276 |
| 7,626,536 | B1 * | 12/2009 | Rihaczek | .................. | G01S 3/46 342/107 |

(Continued)

OTHER PUBLICATIONS

International Search Report dated Sep. 7, 2016 for parent PCT application PCT/EP2016/065842.

(Continued)

*Primary Examiner* — Tsung Yin Tsai
(74) *Attorney, Agent, or Firm* — James E. Walton

(57) ABSTRACT

The invention is directed to a method of identifying at least one type of surface in a digital image, comprising the steps of: (a) dividing (4) the image (2) in sub-images of the same size; (b) analyzing (6) the sub-images for identifying at least one type of surface; (c) sub-dividing (10) into sub-images each of the sub-images (8) of the preceding step where at least one type of surface is not identified; (d) analyzing (6) the sub-images of step (c) for identifying at least one type of surface; and (e) iterating steps (c) and (d). This is a hierarchical split based approach (HSBA) that can be used for detecting water zones in a Synthetic Aperture Radar (SAR) image.

16 Claims, 3 Drawing Sheets

(56) References Cited

U.S. PATENT DOCUMENTS

| | | | |
|---|---|---|---|
| 9,389,311 B1* | 7/2016 | Moya | G01S 13/90 |
| 10,042,048 B1* | 8/2018 | Moya | G01S 13/9029 |
| 2005/0128125 A1* | 6/2005 | Li | F41H 11/12 |
| | | | 342/22 |
| 2007/0127774 A1* | 6/2007 | Zhang | G06K 9/00771 |
| | | | 382/103 |
| 2008/0170751 A1* | 7/2008 | Lei | G06T 7/215 |
| | | | 382/103 |
| 2008/0181453 A1* | 7/2008 | Xu | G06T 7/215 |
| | | | 382/103 |
| 2008/0291081 A1* | 11/2008 | Nonaka | G01S 7/41 |
| | | | 342/176 |
| 2010/0316257 A1* | 12/2010 | Xu | G06K 9/00771 |
| | | | 382/103 |
| 2015/0042510 A1* | 2/2015 | Carande | G01S 13/9023 |
| | | | 342/25 C |
| 2015/0332127 A1* | 11/2015 | Zheng | G06T 7/11 |
| | | | 382/165 |
| 2016/0238704 A1* | 8/2016 | Schultz | E21B 49/00 |
| 2016/0259046 A1* | 9/2016 | Carlbom | G01S 13/9035 |
| 2018/0047173 A1* | 2/2018 | Wang | G06T 7/136 |

OTHER PUBLICATIONS

Fosgate, C., "Multiscale Segmentation and Anomaly Enhancement of SAR Imagery," IEEE Transactions on Image Processing, vol. 6, No. 1, Jan. 1, 1997.

Martinis, S., "A Fully Automated TerraSAR-X Based Flood Service," ISPRS Journal of Photogrammetry and Remote Sensing, vol. 104, Jun. 1, 2015, pp. 203-212.

Giustarini, L., et al., "A Change Detection Approach to Flood Mapping in Urban Areas Using TerraSAR-X," IEEE Transactions on Geoscience and Remote Sensing, vol. 51, No. 4, Apr. 1, 2013, pp. 2417-2430.

Bovolo, F., et al., "A Split-Based Approach to Unsupervised Change Detection in Large-Size Multitemporal Images: Application to Tsunami-Damage Assessment," IEEE Transactions on Geoscience and Remote Sensing, vol. 45, No. 6, Jun. 1, 2007, pp. 1658-1670.

* cited by examiner

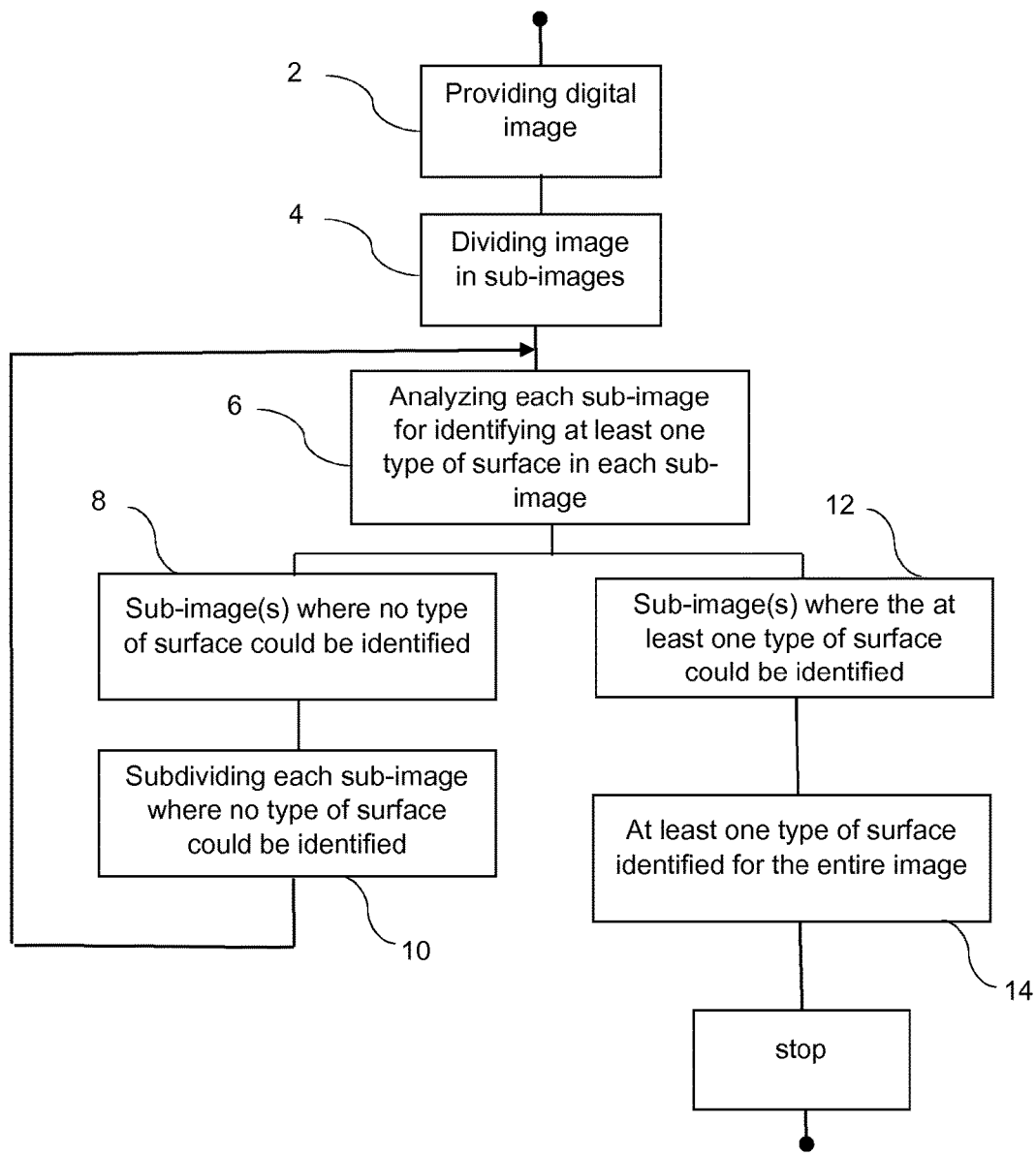

HIERARCHICAL TILING METHOD FOR IDENTIFYING A TYPE OF SURFACE IN A DIGITAL IMAGE

TECHNICAL FIELD

The invention is directed to the field of digital image processing, more particularly to the classification of surface(s) in digital image, such as Synthetic Aperture Radar (SAR) images, where a particular type of surface occupies only a small fraction of the image.

BACKGROUND ART

The publication by F. Bovolo, L. Bruzzone, "A Split-Based Approach to Unsupervised Change Detection in Large-Size Multitemporal Images: Application to Tsunami-Damage Assessment", IEEE Transactions on Geoscience and Remote Sensing, Vol. 45, No. 6, pp. 1658-1670, 2007 discloses a split-based approach for automatically detecting changes in a sequence of images. The method consists essentially in (i) splitting the image into sub-images; (ii) an analysis of each sub-image; and (iii) an automatic threshold-selection procedure. In step (ii) changes are identified by computing the histogram of difference values obtained from two sub-images that are acquired on the same geographical area at two different times. The sub-images are then sorted out according to their probability to contain a significant amount of changed pixels. The subset of the sub-images with a high probability to contain changes is selected and analysed in step (iii) according to a threshold-selection procedure applied separately to each sub-image or to the joint distribution of pixels that is obtained by merging all sub-images of the subset.

The publication S. Martinis, J. Kersten, A. Twele, "A fully automated TerraSAR-X based flood service", ISPRS Journal of Photogrammetry and Remote Sensing, doi:10.1016/j.isprsjprs.2014.07.014, 2015 discloses an automatic image processing to identify flooded surfaces from Synthetic Aperture Radar (SAR) images. The processing of this teaching is also a split-based approach and is based on the backscatter statistics inferred from a single flood image to separate the "water" class from the others.

Both above mentioned teachings apply a split-based approach (SBA). This approach consists in tiling the image in sub-images of equal sizes and defining a threshold based on the histograms inferred from the different tiles. So far, SBA has been used to generate tiles of fixed size. The size is defined in an arbitrary way, using the SAR sensor resolution, the size of the scene and the percentage of the image occupied by the targeted class/population as indicators. However, this method is not efficient because i) the maximum size of the tile enabling the robust parameterization of the distribution function is unknown a priori and ii) the tiling process is not linked to the parameterization process of the distribution function.

SUMMARY OF INVENTION

Technical Problem

The invention has for technical problem to provide a more efficient method for identifying particular types of surface(s) in digital images, in particular SAR images, that occupy only a small fraction of the image.

Technical Solution

The invention is directed to a method of identifying at least one type of surface in a digital image, comprising the steps of: (a) dividing the image in sub-images; (b) analysing the sub-images for identifying the at least one type of surface; with the additional steps of (c) subdividing in sub-images each of the sub-images of the preceding step where the at least one type of surface is not identified; (d) analysing the sub-images of step (c) for identifying the at least one type of surface; (e) iterating steps (c) and (d).

The type(s) of surface in the digital image can correspond to class(es) and/or population(s) of pixels of the image.

According to a preferred embodiment of the invention, in step (c) only the sub-image(s) of the preceding step where the at least one type of surface could not be identified are subdivided.

In step (a) and/or in step (c), the divided or subdivided sub-images are advantageously of the same size. They are preferably non-overlapping. The number of sub-images resulting from the division and/or each subdivision can be of four. They can be square- or rectangle-shaped.

According to a preferred embodiment of the invention, the analysis for identifying at least one type of surface is identical in steps (b) and (d).

According to a preferred embodiment of the invention, the digital image is a synthetic aperture radar SAR image. The digital image can also be a change detection image, i.e. an image that is the difference between two images of the same area acquired at different time steps. In that case, the method can be used to differentiate the pixels that changed from the pixels that did not change.

According to a preferred embodiment of the invention, the analysis for identifying the at least one type of surface is based on backscatter values of the SAR image.

According to a preferred embodiment of the invention, the analysis for identifying the at least one type of surface is based on the detection of several distributions in the total distribution of the number of pixels of the sub-image as a function of their backscatter values.

According to a preferred embodiment of the invention, the analysis for identifying the at least one type of surface is based on the parameterization of two distributions of the number of pixels of the sub-image as a function of their backscatter values.

According to a preferred embodiment of the invention, the first distribution corresponds to the at least one type of surface, whereas the second one corresponds to any other type of surface.

According to a preferred embodiment of the invention, the two distributions have an Ashman D coefficient that is higher than 2.

According to a preferred embodiment of the invention, the number of pixels as a function of the backscatter value is modeled by a theoretical distribution (e.g. Gauss) and fitted using the Levenberg-Marquardt algorithm (LMA).

According to a preferred embodiment of the invention, the at least one type of surface is identified when the number of pixels of the sub-image, related to one of the distributions, corresponds to at least 10%, more preferably at least 20% of the total number of pixels of said sub-image.

According to a preferred embodiment of the invention, the at least one type of surface is a water surface.

According to a preferred embodiment of the invention, the mode of the first distribution is expressed in sigma nought and has a value between −30 dB and −10 dB.

According to a preferred embodiment of the invention, the mode of the second distribution is expressed in sigma nought and has a value comprised between −12 dB and 5 dB.

According to a preferred embodiment of the invention, dividing in step (a) and subdividing in step (c) consist in dividing by four the image, sub-image or each of the sub-images, respectively.

According to a preferred embodiment of the invention, the iteration of step (e) is stopped when in step (d) the at least one type of surface is identified in each of the sub-images of step (c) and/or when the size of the sub-images in step (c) is below a predetermined minimum size.

According to a preferred embodiment of the invention, said method comprises a further step (f) of providing an identification of the at least one type of surface for the entire image based on the identifications at step (b) for each of the sub-images.

The invention is also directed to a device comprising a memory element and computing means, said element and means being configured for carrying out the method according to the invention.

The invention is also directed to a computer capable of carrying out the method according to the invention.

The invention is also directed to a computer program comprising computer readable code means, which, when it is run on a computer, causes the computer to carry out the method according to the invention.

The invention is also directed to a computer program product comprising a computer-readable medium on which the computer program according to the invention is stored.

Advantages of the Invention

The invention proposes a hierarchical split based approach (HSBA) that, contrary to the split based approach (SBA) of the prior art, does not fix the size of the tiles a priori but, rather, searches for tiles of variable size that allow parameterizing the statistical distribution function attributed to surface water-related backscatter values. The tiling and the parameterization processes are thus integrated. The HSBA sequentially and selectively splits the image into sub-images of decreasing size in order to identify tiles of variable size for which a surface water-related distribution function can be parameterized. This procedure thus renders the identification of the at least one type of surface i) objective, ii) independent of the different technical characteristics of the image scene (e.g. spatial resolution or percentage of the extension of the at least one type of surface with respect to extension of the entire image), iii) robust and iv) efficient.

BRIEF DESCRIPTION OF THE DRAWINGS

FIG. 5 is a flow chart depicting the method of the present application.

DESCRIPTION OF AN EMBODIMENT

The following embodiment is directed to a method to delineate water bodies from a SAR image and will be described in combination with FIGS. 1 to 5.

FIGS. 1 to 4 illustrate a SAR image at successive steps of the method according to the invention and FIG. 5 is a flowchart illustrating the principle of the invention.

Figure 1:
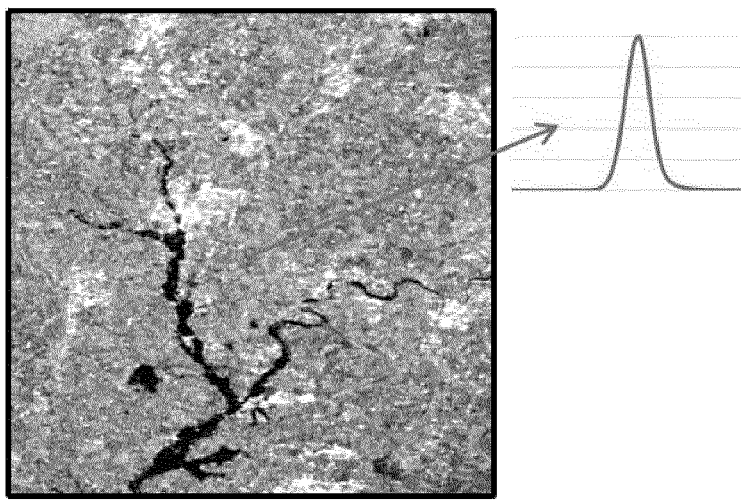
FIG. 1 shows a SAR image where the darker areas correspond to a river with flooded areas, the image being not yet processed according to the invention.

FIG. 1 illustrates a Synthetic Aperture Radar (SAR) image showing a geographical zone with a river and associated flooded areas, visible as darker areas. A synthetic aperture radar, or SAR, is a coherent radar system that generates high-resolution remote sensing imagery. Signal processing uses magnitude and phase of the received signals over successive pulses from elements of a synthetic aperture to create an image. As the line of sight direction changes along the radar platform trajectory, a synthetic aperture is produced by signal processing that has the effect of lengthening the antenna.

Backscatter is the portion of the outgoing radar signal that the target redirects directly back towards the radar antenna. The scattering cross section in the direction toward the radar is called the backscattering cross section; the usual notation is the symbol sigma. It is a measure of the reflective strength of a radar target. The normalised measure of the radar return from a distributed target is called the backscatter coefficient, or sigma nought, and is defined as per unit area on the ground. Other portions of the incident radar energy may be reflected and scattered away from the radar or absorbed.

Generally speaking, the water zones generate a backscattering that is rather different from the non-watered zones. When the proportion of pixels of the image that correspond to water zones is large enough the distribution of the pixels over the backscattering values can be parameterized. This distribution can be a mixture of several distributions, e.g. of the Gaussian-type. The Gaussian-type distribution is illustrated next to the SAR image in FIG. 1. The histogram shows then two identifiable distribution functions, i.e. a first distribution of pixel values for the water zones and a second one for the non-watered zones. This permits a reliable identification of the watered zones.

Watered zones often represent however only a small fraction of an entire SAR scene. In these circumstances it becomes difficult, if not impossible, to accurately parameterize the distribution function of backscatter values associated with watered surface.

Figure 2:
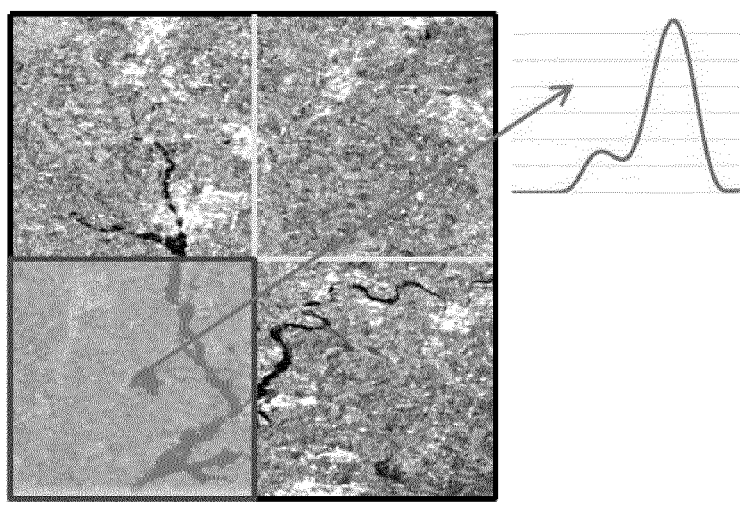
FIG. 2 shows the SAR image of FIG. 1 after a first division of the entire image into four sub-images of the same size.

With reference to FIG. 2, the initial SAR image is divided into four sub-images of the same size, thereby reducing the size of each sub-image by four. As is visible in the figure, the lower left sub-image comprises the highest proportion of watered zones, thereby providing the bimodality in the distribution of the backscattering values of the pixels. This means that for this sub-image, the water zones can be identified in a reliable manner based on the pixel distribution. For the remaining three sub-images, i.e. the top left, top right and bottom right sub-images, this reliable identification is not possible even though the top left and bottom right sub-images contain water zones.

Figure 3:
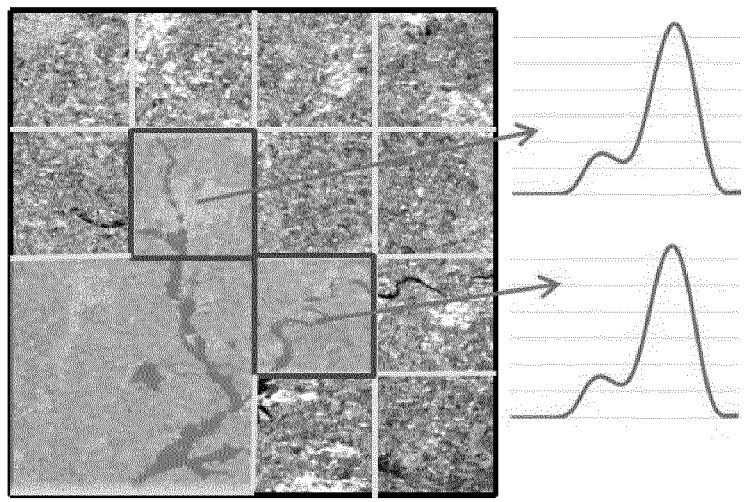
FIG. 3 shows the SAR image of FIG. 2 where three of the sub-images of FIG. 2, where no water surface could be identified, are sub-divided each into four sub-images of the same size.

In FIG. 3, we can observe that each of the above mentioned remaining three sub-images have been subdivided, for instance in four sub-images of the same size. As is apparent in FIG. 3, only two of the twelve newly divided sub-images present bimodality.

Figure 4:
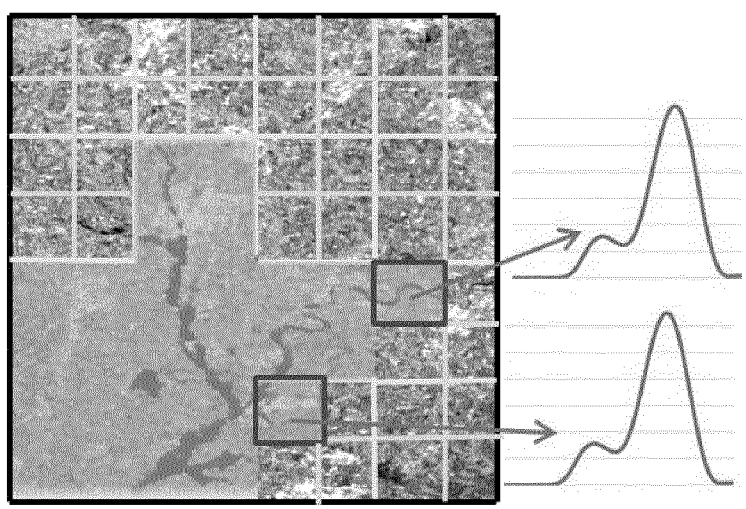
FIG. 4 shows the SAR image of FIG. 3 where ten of the sub-images of FIG. 3, where no water surface could be identified, are sub-divided each into four sub-images of the same size.

In FIG. 4, the remaining recently divided sub-images showing no bimodality are subdivided again, for instance into four sub-images of the same size. As is apparent in FIG. 4, only two of the forty newly divided sub-images show bimodality, so that the remaining 38 sub-images are further subdivided as explained in connection with FIGS. 2, 3 and 4, and so on.

The invention consists therefore in iterating by subdividing the image or sub-images where no water zone can be identified in a reliable manner. In the present embodiment, this identification of the selected sub-images is based on the Ashman D coefficient that is in reality a proxy of the bimodality in the distribution of the backscattering values of the pixels of the image in question. It is however understood that other criteria can be considered for the identification of sub-images of interest. The division or sub-division into four sub-images of the same size is a matter of choice, being understood that other manners of dividing the image and/or sub-images can be considered.

The iteration can be stopped based on different criteria. For example, it can be stopped when reaching a given size of sub-images. It can also be stopped when bimodality is observed for each sub-image.

The identification of water zones by means of the above described bimodality is based on the hypothesis that the image histogram is composed of a mixture of two distributions representing, respectively, the watered and non-watered classes. To calibrate the parameters of the distribution function, a Levenberg-Marquard algorithm (non-linear least squares) can be used, while for evaluating if the two distributions are well identified the Ashman D coefficient can be computed, this coefficient having to be higher than 2. Typically, this processing step assumes that the histogram can be separated into two Gaussian distribution functions. A similar approach is detailed in the publication of Giustarini, L.; Hostache, R.; Matgen, P.; Schumann, G. J.-P.; Bates, P. D.; Mason, D. C., "A Change Detection Approach to Flood Mapping in Urban Areas Using TerraSAR-X," *Geoscience and Remote Sensing, IEEE Transactions on*, vol. 51, no. 4, pp. 2417, 2430, April 2013 doi: 10.1109/TGRS.2012.2210901. However, any other type of distribution function can be considered.

The backscattering sigma nought values of the (Gaussian) distribution that corresponds to water zones have a mode value comprised between −30 dB and −10 dB. Similarly, backscattering sigma nought values of the (Gaussian) distribution that corresponds to non-watered zones have a mode value comprised between −12 dB and 5 dB.

FIG. 5 illustrates with a flowchart the method of the invention. At step 2, an initial digital image is provided, being understood that any type of digital image can be considered, including a SAR image. The initial image can be large, e.g. more than 10000 by 10000 pixels.

At step 4, the initial image is divided in sub-images. This division is preferably made so that the sub-images are of the same size. Their number can be four, whereas other ways of dividing the image can be considered. In other words, the initial image is split into a fixed number of sub-images. These sub-images do not overlap.

At step 6, each of the sub-images resulting from the division of the previous step 4 are analysed for potentially identifying the at least one type of surface. At least one type of surface can be a watered surface as in the embodiment described in relation with FIGS. 1 to 4, being however understood that other types of surfaces could be identified. The identification process that is applied to the sub-images is preferably always the same. This means that for some sub-images, the identification process can provide no tangible result, i.e. no identification of at least one type of surface. In other words, the result of step 6 can be of two types for the different sub-images, i.e. either at least one type of surface is detected or it is not. The identification process can apply various approaches, including the bimodality approach described above in relation with FIGS. 1 to 4.

For the sub-image(s) of step 6 where at least one type of surface could not be identified, as mentioned in step 8, this or each of these sub-image(s) is subdivided in step 10 into further sub-images, preferably following the same division rule as in step 4. For instance, the sub-image or each of these sub-images can be subdivided into four further non-overlapping sub-images of the same size.

These sub-images of reduced size, resulting from step 10, are then analysed at step 6 so as to potentially identify at least one type of surface. With reference to the above discussion of step 6, this operation might result in the identification of at least one type of surface for one or some of the sub-images, whereas it can also result in the absence of identification of at least one type of surface for the remaining sub-images. For these latter, steps 8 and 10 apply in an iterative way. For the other sub-images, i.e. those where at least one type of surface could be identified and as identified in step 12, no further subdivision is proposed and these zones where at least one type of surface has been identified, are saved for constructing the identification of at least one type of surface for the entire initial image.

The above discussed iteration from step 6 to steps 8 and 10 can be repeated until at least one type of surface is identified in each sub-image. Since some portions of the image could be void of at least one type of surface, the iteration can be stopped automatically when reaching a certain minimum size of the sub-images.

The above method can be operated as a computer program that is executed on a computer.

The invention claimed is:

1. Method of identifying at least one type of surface in a synthetic aperture radar (SAR) image, comprising:
   (a) dividing the image in sub-images;
   (b) analyzing, based on backscatter values of the synthetic aperture radar (SAR) image, the sub-images for identifying the at least one type of surface;
   (c) subdividing in sub-images each of the sub-images of the preceding step where the at least one type of surface is not identified;
   (d) analyzing the sub-images of step (c) for identifying the at least one type of surface; and
   (e) iterating steps (c) and (d);
   wherein step (b) is based on the parametrization of two distributions of the number of pixels of the sub-image as a function of their backscatter values.

2. Method according to claim 1, wherein in step (c) only the sub-image(s) of the preceding step where the at least one type of surface is/are not identified are subdivided.

3. Method according to claim 1, wherein the analysis for identifying the at least one type of surface is identical in steps (b) and (d).

4. Method according to claim 1, wherein the analysis for identifying the at least one type of surface is based on the detection of several distributions in the total distribution of the number of pixels of the sub-image as a function of their backscatter values.

5. Method according to claim 1, wherein a first distribution of the two distributions corresponds to the at least one type of surface and a second distribution of the two distributions corresponds to any other type of surface.

6. Method according to claim 1, wherein the two distributions have an Ashman D coefficient that is higher than 2.

7. Method according to claim 1, wherein the number of pixels as a function of the backscatter value is modelled by a theoretical distribution, like a Gauss distribution, and fitted using the Levenberg-Marquardt algorithm LMA.

8. Method according to claim 1, wherein the at least one type of surface is identified when the number of pixels of the sub-image that relate to one of the distributions corresponds to one of the following:
- at least 10% of the total number of pixels of said sub-image; or
- at least 20% of the total number of pixels of said sub-image.

9. Method according to claim 1, wherein the at least one type of surface is a water surface.

10. Method according to claim 1, wherein the mode of distribution is expressed in sigma nought and has a value between −30 dB and −10 dB.

11. Method according to claim 1, wherein the mode of the second distribution is expressed in sigma nought and has a value between −12 dB and 5 dB.

12. Method according to claim 1, wherein dividing in step (a) and subdividing in step (c) consist in dividing by four the image, sub-image or each of the sub-images, respectively.

13. Method according to claim 1, wherein the iteration of step (e) is stopped when in step (d) the at least one type of surface is identified in each of the sub-images of step (c).

14. Method according to claim 1, further comprising:
(f) providing an identification of the at least one type of surface for the entire image based on the identifications of at least one type of surface at step (b) for each of the sub-images.

15. A device, comprising:
a memory element; and
computing means;
wherein the memory element and the computing means are configured for carrying out a method of identifying at least one type of surface in a synthetic aperture radar (SAR) image, comprising:
(a) dividing the image in sub-images;
(b) analyzing, based on backscatter values of the synthetic aperture radar (SAR) image, the sub-images for identifying the at least one type of surface;
(c) subdividing in sub-images each of the sub-images of the preceding step where the at least one type of surface is not identified;
(d) analyzing the sub-images of step (c) for identifying the at least one type of surface; and
(e) iterating steps (c) and (d);
wherein step (b) is based on the parametrization of two distributions of the number of pixels of the sub-image as a function of their backscatter values.

16. A computer program for improving the performance of a computer, comprising:
computer readable code means, which when run on a computer, causes the computer to carry out a method of identifying at least one type of surface in a synthetic aperture radar (SAR) image, comprising:
(a) dividing the image in sub-images;
(b) analyzing, based on backscatter values of the synthetic aperture radar (SAR) image, the sub-images for identifying the at least one type of surface;
(c) subdividing in sub-images each of the sub-images of the preceding step where the at least one type of surface is not identified;
(d) analyzing the sub-images of step (c) for identifying the at least one type of surface; and
(e) iterating steps (c) and (d);
wherein step (b) is based on the parametrization of two distributions of the number of pixels of the sub-image as a function of their backscatter values.

* * * * *